United States Patent
Hsia et al.

(10) Patent No.: US 11,949,224 B2
(45) Date of Patent: Apr. 2, 2024

(54) OUTPUT IMPEDANCE AND LOAD INDEPENDENT LATCH-OFF TIMER FOR VOLTAGE-LIMIT MODE PROTECTION

(71) Applicants: Timothy T. Hsia, Irvine, CA (US); Victor K. Lee, Irvine, CA (US)

(72) Inventors: Timothy T. Hsia, Irvine, CA (US); Victor K. Lee, Irvine, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 118 days.

(21) Appl. No.: 17/704,089

(22) Filed: Mar. 25, 2022

(65) Prior Publication Data
US 2023/0307903 A1    Sep. 28, 2023

(51) Int. Cl.
*H02H 3/20*    (2006.01)
*H02H 1/00*    (2006.01)

(52) U.S. Cl.
CPC ............ *H02H 3/20* (2013.01); *H02H 1/0007* (2013.01)

(58) Field of Classification Search
CPC .............................. H02H 3/20; H02H 1/0007
USPC .......................................................... 361/18
See application file for complete search history.

(56) References Cited

U.S. PATENT DOCUMENTS

| 5,029,269 A | 7/1991 | Elliott et al. |
| 10,924,003 B2 | 2/2021 | Maejima |
| 2012/0287540 A1* | 11/2012 | Dobkin ............... H02H 1/06 361/89 |

FOREIGN PATENT DOCUMENTS

| SU | 654940 A | * | 3/1979 |
| SU | 654940 A1 | | 3/1979 |

OTHER PUBLICATIONS

Machine translation of Malakhov et al. Soviet Patent Document SU 654940 A Mar. 30, 1979 (Year: 1979).*

* cited by examiner

*Primary Examiner* — Kevin J Comber
(74) *Attorney, Agent, or Firm* — Tarolli, Sundheim, Covell & Tummino LLP

(57) ABSTRACT

One example includes a power supply system. The system includes a voltage-limit power regulator to generate an output voltage and an instantaneous overvoltage sensor configured to detect an overvoltage condition associated with the output voltage. The system further includes an overvoltage latch-off timer system configured to initiate a latch-off timer in response to detecting the overvoltage condition. The latch-off timer can be uninterrupted by an amplitude of the output voltage. The overvoltage latch-off timer system can further be configured to detect a persistent overvoltage fault in response to detecting the overvoltage condition after expiration of the latch-off timer. The overvoltage latch-off timer system can be configured to generate a fault signal to disable the voltage-limit power regulator in response to detecting the persistent overvoltage fault.

20 Claims, 5 Drawing Sheets

OUTPUT IMPEDANCE AND LOAD INDEPENDENT LATCH-OFF TIMER FOR VOLTAGE-LIMIT MODE PROTECTION

GOVERNMENT INTEREST

The invention was made under Government Contract. Therefore, the US Government has rights to the invention as specified in that contract.

TECHNICAL FIELD

The present invention relates generally to electronic circuits, and specifically to an output impedance and load independent latch-off timer for voltage-limit mode protection.

BACKGROUND

Power supply circuits are implemented in a variety of circuits for converting a direct current (DC) or alternating current (AC) voltage into a different voltage (e.g., a DC voltage). A given power supply circuit can thus generate an output voltage that is implemented to provide power to other circuits or other parts of a circuit. An overvoltage (OV) condition of a power supply can result in a reduced operational lifetime of the circuit or can result in damage of the circuit components (e.g., transistors) therein. Therefore, OV protection can be beneficial to maintain operational life of a circuit. Some OV protection systems employ a latch-off timer to distinguish between a temporary OV condition that could be the result of a false trigger of the OV detection circuit, and a bona-fide, sustained OV event that can result in damage to the circuit, in which the protection circuit will permanently latch-off the system. The determination of the latch-off timer duration is based upon the reliability tolerance of the loading circuit components and the timer duration must be precisely controlled. However, a power supply with instantaneous output overvoltage protection circuit can operate in a voltage-limit mode during an overvoltage event, in which the output voltage can bounce around the overvoltage threshold amplitude, creating a large, aperiodic, and irregular ripple waveform whose time-varying frequency and magnitude are directly dependent on the power supply's output impedance and dynamic loading condition. The aperiodic nature of the output waveform in voltage-limit mode in turn causes the OV latch-off timer in a system with instantaneous OV protection to become highly inaccurate with a large variation in its duration.

SUMMARY

One example includes a power supply system. The system includes a power regulator to operate in voltage-limit mode and to generate an output voltage and an instantaneous overvoltage sensor configured to detect an overvoltage condition associated with the output voltage. The system further includes an overvoltage latch-off timer system configured to initiate a latch-off timer in response to detecting the overvoltage condition. The latch-off timer can be uninterrupted by an amplitude of the output voltage. The overvoltage latch-off timer system can further be configured to detect a persistent overvoltage fault in response to detecting the overvoltage condition after expiration of the latch-off timer. The overvoltage latch-off timer system can be configured to generate a latch-off signal to disable the voltage-limit power regulator in response to detecting the persistent overvoltage fault.

Another example includes a method for detecting a persistent overvoltage fault in a power supply system. The method includes detecting an overvoltage condition associated with the output voltage provided from a power regulator operating in voltage-limit mode. The method also includes generating an overvoltage signal in response to the overvoltage condition and initiating a latch-off timer in response to the overvoltage signal. The latch-off timer can be uninterrupted by an amplitude of the output voltage. The method also includes determining the persistent overvoltage fault in response to the overvoltage signal after expiration of the latch-off timer and generating a latch-off signal to disable the voltage-limit power regulator in response to detecting a persistent overvoltage fault. The method further includes detecting a nuisance overvoltage condition in response to not detecting the overvoltage condition after expiration of the latch-off timer and before expiration of a nuisance overvoltage timer.

Another example includes a power supply system. The system includes a power regulator to operate in voltage-limit mode and to generate an output voltage and an instantaneous overvoltage sensor configured to detect an overvoltage condition associated with the output voltage. The system further includes an overvoltage latch-off timer system. The overvoltage latch-off timer system includes a latch-off timer circuit configured to initiate a latch-off timer in response to detecting the overvoltage condition. The latch-off timer can be uninterrupted by an amplitude of the output voltage. The overvoltage latch-off timer system further includes a finite state machine (FSM) controller system configured to detect a persistent overvoltage fault in response to detecting the overvoltage condition after expiration of the latch-off timer and to generate a fault signal to permanently disable the voltage-limit power regulator in response to detecting the persistent overvoltage fault. The FSM controller system can detect a nuisance or temporary overvoltage condition in response to not detecting the overvoltage condition after expiration of the latch-off timer and before expiration of a nuisance overvoltage timer. Also, the FSM controller system can reset the latch-off timer in response to not detecting the overvoltage condition after expiration of the latch-off timer and before expiration of a nuisance overvoltage timer. Furthermore, the FSM controller includes radiation hardened circuits that eliminates incorrect and/or premature latch-off of the power system and/or resetting of the latch-off timer.

DETAILED DESCRIPTION

Figure 1:
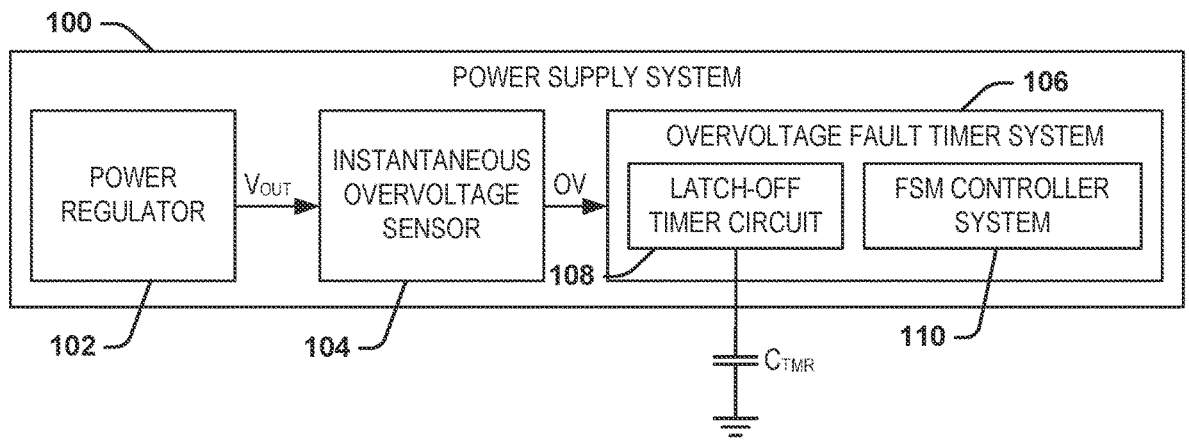
FIG. 1 illustrates an example block diagram of a power supply system.

The present invention relates generally to electronic circuits, and specifically to an output impedance and load independent latch-off timer for voltage-limit mode protection. The power supply system can be implemented as any of a variety of power supply systems that can provide an output voltage (e.g., a direct current (DC) output voltage). The power supply system can include a power regulator that is configured to operate in voltage-limit mode and to generate the output voltage, such as based on an input voltage (e.g., a DC or alternating current (AC) voltage). As an example, the voltage-limiting power regulator can be fabricated as any of a variety of power regulators, such as a switching power supply (e.g., full or half bridge, resonant, rectifying, buck, boost, buck-boost), a linear power supply, or any of a variety of other types of power regulators.

The power supply system also includes an instantaneous overvoltage sensor and an overvoltage latch-off timer system. The instantaneous overvoltage sensor can be configured to monitor the output voltage to detect an overvoltage condition. The overvoltage latch-off timer system can detect the occurrence of a persistent overvoltage fault based on the detection of the overvoltage condition. As described herein, the term "overvoltage condition" refers to an amplitude of the output voltage that is greater than or approximately equal to a predetermined overvoltage reference signal. Thus, the overvoltage condition may be a temporary occurrence that can be rapidly alleviated by the instantaneous overvoltage protection circuit, resulting in voltage-limit mode. As described herein, the term "persistent overvoltage fault" refers to a more serious state of the power supply circuit, in which overvoltage conditions may be very frequent and/or very persistent in duration, thus indicating a permanent fault with the power supply circuit. Accordingly, the persistent overvoltage fault may necessitate permanent latch-off (e.g., shutdown) of the power supply circuit and/or indication of the fault to other parts of the circuit.

The overvoltage latch-off timer system includes a latch-off timer circuit and a finite state machine (FSM) controller system. In response to detecting the overvoltage condition, the latch-off timer circuit is configured to initiate a latch-off timer corresponding to a voltage that increases at a constant slope as a function of time irrespective of the amplitude of the output voltage. After expiration of the latch-off timer, the FSM controller system can determine the presence of a persistent overvoltage fault in response to the overvoltage signal. As an example, the latch-off timer can be initiated by latching a voltage to activate (e.g., close) a switch to charge a timing capacitor, such that the latched voltage is maintained regardless of the state of the overvoltage switch, and thus the amplitude of the output voltage. Therefore, the latch-off timer can operate with a predictable time regardless of output impedance or load associated with the power supply circuit. Accordingly, unlike a latch-off timer in a typical overvoltage latch-off timer system that has timing based on the amplitude of the output voltage, the latch-off timer can have a time value that is highly predictable from the time of being initiated to the time of expiration. Furthermore, as described herein, the FSM controller system can determine the presence of a temporary or nuisance overvoltage condition in response to expiration of a nuisance overvoltage timer. As described herein, the term "nuisance overvoltage condition" refers to not detecting a persistent overvoltage fault, despite the presence of an overvoltage condition, and is thus a determination that the overvoltage condition is not serious enough to warrant a persistent overvoltage fault and a resultant deactivation of the voltage-limiting power regulator.

FIG. 1 illustrates an example block diagram of a power supply system 100. The power supply system 100 can be implemented as any of a variety of applications that require converting a voltage from one type and/or amplitude to another, such as to convert an AC voltage or a DC voltage to another DC voltage. The power supply system 100 includes a voltage-limiting power regulator 102, an instantaneous overvoltage sensor 104, and an overvoltage latch-off timer system 106. The voltage-limiting power regulator 102 is configured to generate an output voltage $V_{OUT}$ (e.g., a DC output voltage), such as based on an input voltage. As an example, the voltage-limiting power regulator 102 can be fabricated as any of a variety of power supply circuits, such as a switching power supply (e.g., full or half bridge, resonant, rectifying, buck, boost, buck-boost), a linear power supply, or any of a variety of other types of power regulators.

In the example of FIG. 1, the voltage-limiting power regulator 102 is configured to reduce the amplitude of the output voltage $V_{OUT}$ in response to an excessive amplitude of the output voltage $V_{OUT}$. As another example, the voltage-limiting component of the voltage-limiting power regulator 102 can clamp the output voltage $V_{OUT}$ at a clamping amplitude. The voltage-limiting component of the voltage-limiting power regulator 102 can thus provide limited protection of an overvoltage condition associated with the output voltage $V_{OUT}$, such as by clamping the output voltage $V_{OUT}$ in response to a short-circuit or other condition that can cause the overvoltage condition. For example, the voltage-limiting component of the voltage-limiting power regulator 102 can decrease the output voltage $V_{OUT}$ at each switching cycle of the voltage-limiting power regulator 102, thus resulting in ratcheting of the output voltage $V_{OUT}$ during an overvoltage condition, as described in greater detail herein.

The instantaneous overvoltage sensor 104 is configured to monitor the output voltage $V_{OUT}$ to detect an overvoltage condition. As an example, the instantaneous overvoltage sensor 104 can be configured to compare the output voltage $V_{OUT}$ with a predetermined overvoltage reference signal to generate an overvoltage signal (e.g., assert to a logic-high state) in response to the output voltage $V_{OUT}$ being greater than the overvoltage reference voltage. In the example of FIG. 1, the overvoltage signal is demonstrated as a signal OV.

The overvoltage latch-off timer system 106 includes a latch-off timer circuit 108 and a finite state machine (FSM) controller system 110. In response to detecting the overvoltage condition via the overvoltage signal OV, the latch-off timer circuit 108 can be configured to initiate a latch-off timer. In the example of FIG. 1, the latch-off timer is arranged as a timing capacitor $C_{TMR}$ that can be charged by a charging current through a charging switch, such that the charging switch is latched to a closed state to charge the timing capacitor $C_{TMR}$ in response to the overvoltage condition. The timing capacitor $C_{TMR}$ can thus exhibit an increase of a timing voltage having a constant slope that is defined by the capacitance of the timing capacitor $C_{TMR}$. The timing capacitor $C_{TMR}$, and thus the latch-off timer, can define a time duration to expiration, after which the FSM controller system 110 can detect a persistent overvoltage fault. As an example, the timing capacitor $C_{TMR}$ can be configured as an external component with respect to the power supply system 100, such that the timing capacitor $C_{TMR}$ can be provided by a user after fabrication of the power supply system 100 to allow the user to set a desired time duration of the latch-off timer.

As described above, the latch-off timer of the latch-off timer circuit 108 is initiated in response to detection of the overvoltage condition. After expiration of the latch-off timer, the FSM controller system 110 can determine whether or not the voltage-limiting power regulator 102 has experienced a persistent overvoltage fault. As an example, the latch-off timer can expire in response the timing voltage described above having an amplitude that is approximately equal to a threshold voltage. After expiration of the latch-off timer, if an overvoltage condition is detected, the FSM controller system 110 detects the persistent overvoltage fault. As described in greater detail herein, the FSM controller system 110 can detect the persistent overvoltage fault after expiration of the latch-off timer and in response to at least one predetermined condition. As an example, the FSM controller system 110 can thus provide a fault signal to the voltage-limiting power regulator 102 to disable (e.g., shut down) the voltage-limiting power regulator 102. As another example, the fault signal can provide indication of the persistent overvoltage fault to other parts of the circuit and/or to a user interface.

As an example, the latch-off timer can define a detection window for detecting the overvoltage vault via the FSM controller system 110. For example, the detection window can be defined by the timing voltage having an amplitude that is between a first threshold voltage corresponding to expiration of the latch-off timer and a second threshold voltage that is greater than the first threshold voltage and which corresponds to expiration of a nuisance overvoltage timer. Thus, if the FSM controller system 110 detects the overvoltage condition after expiration of the latch-off timer but before expiration of a nuisance overvoltage timer, the FSM controller system 110 can provide the fault signal, as described above. However, if the FSM controller system 110 does not detect the overvoltage condition after expiration of the nuisance overvoltage timer, the FSM controller system 110 can provide a reset signal to reset the overvoltage latch-off timer system 106. For example, the reset signal can unlatch the latching of the charging switch and can discharge the timing capacitor $C_{TMR}$. Therefore, the reset signal can indicate a false trip with respect to a potential persistent overvoltage fault, nuisance overvoltage condition, thus allowing the power supply system 100 to maintain normal operation.

Figure 2:
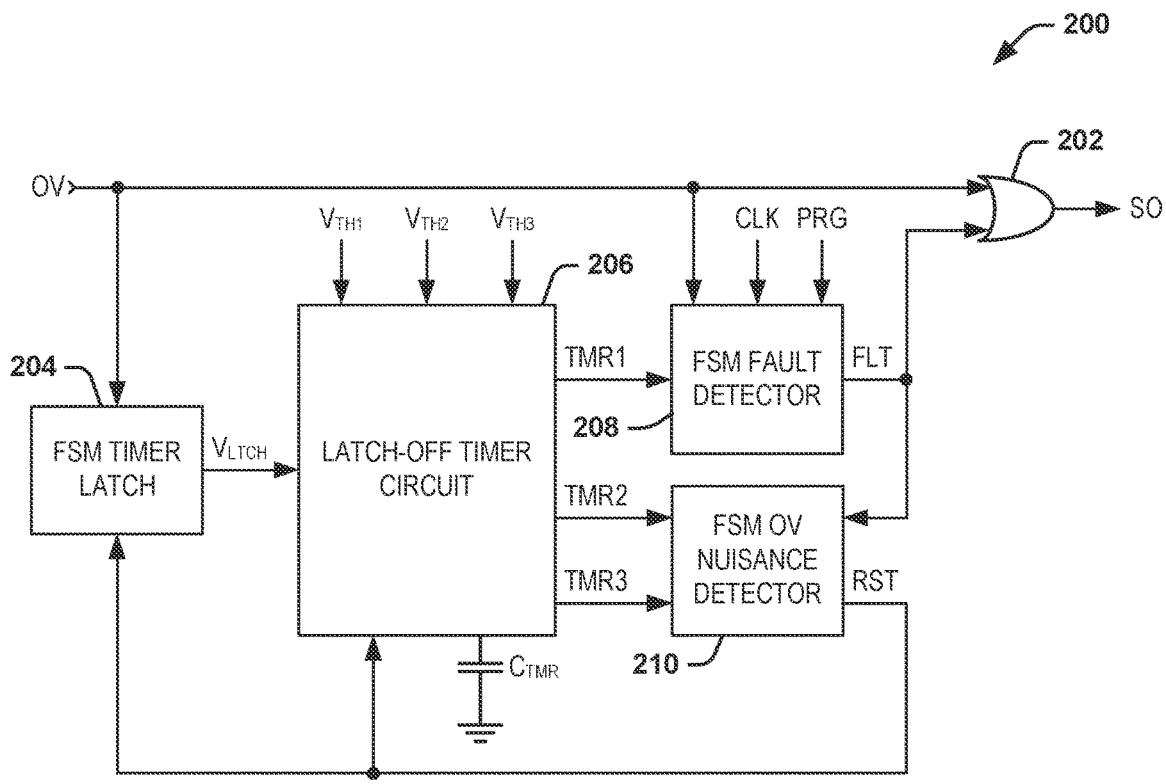
FIG. 2 illustrates an example of an overvoltage latch-off timer system.

FIG. 2 illustrates an example of an overvoltage latch-off timer system 200. The overvoltage latch-off timer system 200 can correspond to the overvoltage latch-off timer system 106 in the example of FIG. 1. Therefore, reference is to be made to the example of FIG. 1 in the following description of the example of FIG. 2.

The overvoltage latch-off timer system 200 receives the overvoltage signal OV as an input. As described above in the example of FIG. 1, the overvoltage signal OV corresponds to an overvoltage condition in which the output voltage $V_{OUT}$ is greater than a predetermined overvoltage threshold amplitude. The overvoltage signal OV is provided to an OR-gate 202 that is configured to generate a shutoff signal SO that is provided to the voltage-limiting power regulator 102 to deactivate the voltage-limiting power regulator 102. As a result, in response to an overvoltage condition, such as indicated by a logic-high state of the overvoltage signal OV, the OR-gate 202 provides the shutoff signal SO to deactivate the voltage-limiting power regulator 102, thereby decreasing the amplitude of the output voltage $V_{OUT}$.

In the example of FIG. 2, the overvoltage signal OV is also provided to a timer latch 204 ("FSM TIMER LATCH") that is part of the FSM controller system 110. The timer latch 204 is configured to provide a latching voltage $V_{LTCH}$ in response to detecting the logic-high state of the overvoltage signal OV, and thus the overvoltage condition. In the example of FIG. 2, the overvoltage latch-off timer system 200 includes a latch-off timer circuit 206. The latch-off timer circuit 206 is activated by the latching voltage $V_{LTCH}$ to initiate a latch-off timer. In the example of FIG. 2, the latch-off timer is arranged as a timing capacitor $C_{TMR}$ that can be charged by a charging current through a charging switch, such that the charging switch is latched to a closed state to charge the timing capacitor $C_{TMR}$ in response to the latching voltage $V_{LTCH}$. The timing capacitor $C_{TMR}$ can thus exhibit an increase of a timing voltage having a constant slope that is defined by the capacitance of the timing capacitor $C_{TMR}$. The timing capacitor $C_{TMR}$, and thus the latch-off timer, can define a time duration to expiration. As an example, the timing capacitor $C_{TMR}$ can be configured as an external component with respect to the power supply system 100, such that the timing capacitor $C_{TMR}$ can be provided by a user after fabrication of the power supply system 100 to allow the user to set a desired time duration of the latch-off timer.

In the example of FIG. 2, the latch-off timer circuit 206 receives a first threshold voltage $V_{TH1}$, a second threshold voltage $V_{TH2}$, and a third threshold voltage $V_{TH3}$. Each of the threshold voltages $V_{TH1}$, $V_{TH2}$, and $V_{TH3}$ can define separate timers corresponding to separate conditions for detecting a persistent overvoltage fault and a nuisance overvoltage condition. As an example, the third threshold voltage $V_{TH3}$ can be greater than the first threshold voltage $V_{TH1}$, and the second threshold voltage $V_{TH2}$ can be greater than the third threshold voltage $V_{TH2}$. The latch-off timer circuit 206 is configured to provide a first timer signal TMR1 in response to the timing voltage increasing to be approximately equal to the first threshold voltage $V_{TH1}$. The latch-off timer circuit 206 is configured to provide a second timer signal TMR2 in response to the timing voltage increasing to be approximately equal to the second threshold voltage $V_{TH2}$. The latch-off timer circuit 206 is further configured to provide a third timer signal TMR3 in response to the timing voltage decreasing to less than the third threshold voltage $V_{TH3}$. As described in greater detail herein, the third threshold voltage $V_{TH3}$ can have an amplitude that is close to the amplitude of the second threshold voltage $V_{TH2}$ (e.g., closer in amplitude to the second threshold voltage $V_{TH2}$ than the first threshold voltage $V_{TH1}$) to provide for radiation-hardened design considerations. As an example, the power supply system 100 can be designed for specific environmental considerations (e.g., radiation hardened by design (RHBD), such as for use in space). Therefore, radiation-hardened design considerations are provided for a number of features of the power supply system 100, as described herein.

The first timer signal TMR1 is provided to a fault detector ("FSM FAULT DETECTOR") 208 that is part of the FSM controller system 110. In response to the first timer signal TMR1 being provided (e.g., a state change to logic-high) to the fault detector 208, and thus the expiration of the latch-off timer, the fault detector 208 can determine if a persistent overvoltage fault is detected. The fault detector 208 receives the overvoltage signal OV, such that if the overvoltage signal OV is provided (e.g., logic-high) to the fault detector 208 after expiration of the latch-off timer, then the fault detector 208 can provide a fault signal FLT that is latched to indicate the persistent overvoltage fault. The fault signal FLT is provided to the OR-gate 202, such that the latched fault signal FLT results in a latched condition of the shutoff signal SO. Accordingly, the latched shutoff signal SO can deactivate the voltage-limiting power regulator 102 as a result of the persistent overvoltage fault.

As another example, the fault detector 208 can detect the persistent overvoltage fault based on at least one predetermined condition. In the example of FIG. 2, the fault detector 208 receives a clock signal CLK and a programming signal PRG. The clock signal CLK can correspond to a system clock associated with the system in which the power supply system 100 is implemented, and can thus have a constant frequency. The programming signal PRG can correspond to a programmable digital signal that can define the predetermined condition(s) associated with the detecting the persistent overvoltage fault. As an example, the programming signal PRG can define a number of cycles of the clock signal CLK at which the overvoltage signal OV is provided before detecting the persistent overvoltage fault. As another example, the programming signal PRG can define a number of rising-edges of the overvoltage signal OV within a predetermined number of cycles of the clock signal CLK before detecting the persistent overvoltage fault. The combination of the clock signal CLK and the programming signal PRG can thus define any of a variety or programmable conditions as prerequisite for detecting the persistent overvoltage fault.

The overvoltage latch-off timer system 200 further includes an overvoltage nuisance detector ("FSM FAULT DETECTOR") 210 that is part of the FSM controller system 110. As an example, the overvoltage nuisance detector 210 can be configured as an SR-latch, and can be configured to favor the "set" input to provide for radiation-hardened design considerations, as described in greater detail herein. The overvoltage nuisance detector 210 is demonstrated as receiving the second timer signal TMR2 (e.g., at the set input) and the third timer signal TMR3 (e.g., at the reset input), as well as the fault signal FLT (e.g., at the reset input) that is provided from the fault detector 208. The second timer signal TMR2 can be provided in response to the timing voltage increasing to be approximately equal to the second threshold voltage $V_{TH2}$, which can correspond to the nuisance overvoltage timer.

As described above, the second threshold voltage $V_{TH2}$ is greater than the first threshold voltage $V_{TH1}$. Therefore, in response to the timing voltage increasing to approximately the amplitude of the second threshold voltage $V_{TH2}$, the nuisance overvoltage timer is expired. If the fault detector 208 does not detect the persistent overvoltage fault after expiration of the latch-off timer, then upon expiration of the nuisance overvoltage timer, the overvoltage nuisance detector 210 can provide a reset signal RST to indicate the overvoltage nuisance condition. The reset signal RST can thus reset the overvoltage latch-off timer system 200. In the example of FIG. 2, the reset signal RST is provided to the timer latch 204 to unlatch the latching voltage $V_{LTCH}$, and is also provided to the latch-off timer circuit 206 to begin discharge of the timing capacitor $C_{TMR}$. As a result, the overvoltage condition can correspond to a nuisance overvoltage condition, and the normal operation of the voltage-limiting power regulator 102 can be maintained. However, in response to detection of the persistent overvoltage fault, the fault signal FLT is provided to the overvoltage nuisance detector 210, thus disabling the overvoltage nuisance detector 210 in response to the detection of the persistent overvoltage fault.

As described above, the overvoltage nuisance detector 210 also receives the third timer signal TMR3 that is provided to a reset input. The third timer signal TMR3 can be asserted (e.g., logic-high) in response to the timing voltage being less than the third threshold voltage $V_{TH3}$. Therefore, as the timing voltage increases in response to the latching voltage $V_{LTCH}$ initiating the latch-off timer, the third timer signal TMR3 can be logic-high to hold the overvoltage nuisance detector 210 in the reset state. As also described above, the third threshold voltage $V_{TH3}$ can have an amplitude that is closer in amplitude to the second threshold voltage $V_{TH2}$ than the first threshold voltage $V_{TH1}$. Accordingly, the overvoltage nuisance detector 210 can be held in the reset state until just prior to the expiration of the nuisance overvoltage timer to provide for radiation-hardened design considerations (e.g., that can affect an undesired state change of the second timer signal TMR2).

Upon expiration of the nuisance overvoltage timer, the third timer signal TMR3 can be logic-low based on the timing voltage being greater than the third threshold voltage $V_{TH3}$, and the second timer signal TMR2 can be asserted based on the timing voltage being equal to the second threshold voltage $V_{TH2}$. Therefore, the second timer signal TMR2 can be provided to the set input of the overvoltage nuisance detector 210 to provide the SR-latch of the overvoltage nuisance detector 210 to the set condition to latch the reset signal RST. As described in greater detail herein, the reset signal RST can open a switch to discharge the timing capacitor $C_{TMR}$ to decrease the timing voltage. However, in response to the timing voltage decreasing less than the third threshold voltage $V_{TH3}$, the third timer signal TMR3 can be asserted (e.g., logic-high) again to set the reset condition of the overvoltage nuisance detector 210. Accordingly, the reset signal RST can be de-asserted in response to the third timer signal TMR3 to allow the timing voltage to decrease more slowly after detection of the nuisance overvoltage condition.

Figure 3:
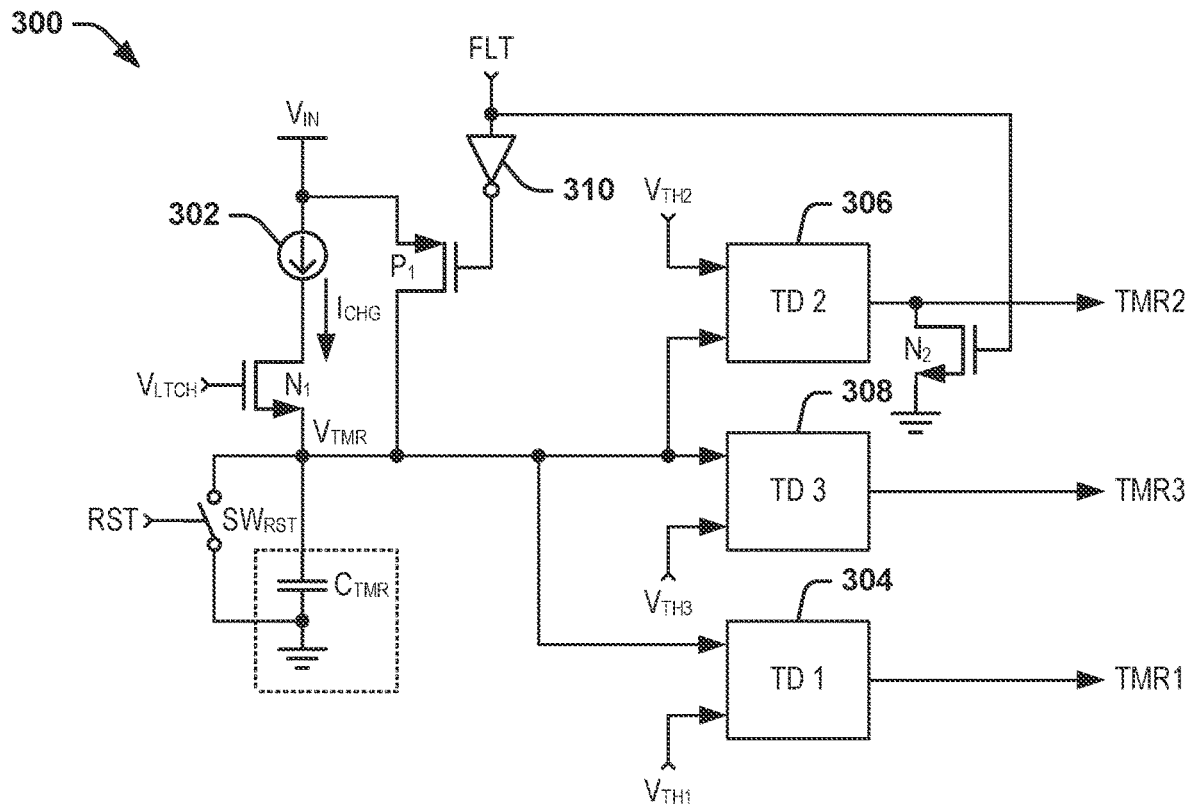
FIG. 3 illustrates an example of a latch-off timer circuit.

FIG. 3 illustrates an example of a latch-off timer circuit 300. The latch-off timer circuit 300 can correspond to the latch-off timer circuit 108 in the example of FIG. 1. Therefore, reference is to be made to the example of FIGS. 1 and 2 in the following description of the example of FIG. 3.

In the example of FIG. 3, the latch-off timer is formed by a current supply 302, a charging switch $N_1$, demonstrated as an N-channel field-effect transistor (N-FET), and a timing capacitor $C_{TMR}$. Thus, in response to the latching voltage $V_{LTCH}$, the charging switch $N_1$ is latched closed. The current supply 302 thus provides a charging current $I_{CHG}$ from an input voltage $V_{IN}$ through the closed charging switch $N_1$. As a result, the timing capacitor $C_{TMR}$ thus exhibits an increase of a timing voltage $V_{TMR}$ at a constant slope that is defined by the capacitance of the timing capacitor $C_{TMR}$. Because the timer latch 204 latches the latching voltage $V_{LTCH}$, a logic-state change of the overvoltage signal OV from a logic-high to a logic-low has no effect on the amplitude of the latching voltage $V_{LTCH}$. Therefore, changes to the amplitude of the output voltage $V_{OUT}$ (e.g., resulting from ratcheting of the output voltage $V_{OUT}$ via the voltage-limiting power regulator 102), and therefore changes to the logic-state of the overvoltage signal OV, have no effect on the amplitude of the timing voltage $V_{TMR}$ after the initial latching of the latching voltage $V_{LTCH}$ via the timer latch 204.

The timing capacitor $C_{TMR}$ thus defines a constant linear slope of the increase of the timing voltage $V_{TMR}$ upon initiation of the latch-off timer. As an example, the timing capacitor $C_{TMR}$ can be configured as an external component with respect to the overvoltage latch-off timer system 200, such that the timing capacitor $C_{TMR}$ can be provided by a user after fabrication of the latch-off timer circuit 300 to allow the user to set a desired time duration of the latch-off timer. Therefore, unlike a latch-off timer in a typical overvoltage latch-off timer system that has timing based on the amplitude of the output voltage, the latch-off timer formed by the timing capacitor $C_{TMR}$ can have a time value that is highly predictable from the time of being initiated to the time of expiration. In other words, a typical overvoltage latch-off timer system does not latch the overvoltage condition, so the charging of any capacitor to define a latch-off timer can be interrupted (e.g., inconsistent), such as during ratcheting of the output voltage. Such inconsistent and interrupted charging can provide for a highly unpredictable timer (e.g., inaccurate to an order of magnitude from testing), which can result in difficulty in planning for how to manage and detect a persistent overvoltage fault. However, by latching the initiation of the timer described herein, the charging of the timing capacitor $C_{TMR}$ can be continuous and uninterrupted, even despite changes to the output voltage $V_{OUT}$ relative to the overvoltage reference voltage, resulting in a timer that can be highly predictable for detection of a persistent overvoltage fault. Accordingly, the timer can operate with a predictable time regardless of output impedance or load associated with the power supply circuit.

In the example of FIG. 3, the timing voltage $V_{TMR}$ is provided to a first threshold detector ("TD 1") 304, a second threshold detector ("TD 2") 306, and a third threshold detector ("TD 3") 308. As an example, the threshold detectors 304, 306, and 308 can be configured as or can include a comparator and/or other associated circuitry for detecting a relative voltage amplitude. The first threshold detector 304 is configured to compare the timing voltage $V_{TMR}$ with the first threshold voltage $V_{TH1}$, such that the first threshold detector 304 provides a first timer signal TMR1 at a logic-high state in response to the timing voltage $V_{TMR}$ being greater than the first threshold voltage $V_{TH1}$. The first timer signal TMR1 is provided to the fault detector 208, as described above in the example of FIG. 2, and thus corresponds to expiration of the latch-off timer. Therefore, upon receiving the first timer signal TMR1 corresponding to the expiration of the latch-off timer, the fault detector 208 can determine whether or not the power supply system 100 has experienced a persistent overvoltage fault. The latch-off timer can thus provide for sufficient time for the output voltage $V_{OUT}$ to settle to an acceptable amplitude, such as in response to a nuisance overvoltage condition, as described in greater detail herein.

The second threshold detector 306 is configured to compare the timing voltage $V_{TMR}$ with the second threshold voltage $V_{TH2}$ that is greater than the first threshold voltage $V_{TH1}$. Therefore, the second threshold detector 306 provides a second timer signal TMR2 at a logic-high state in response to the timing voltage $V_{TMR}$ being approximately equal to the second threshold voltage $V_{TH2}$. The time between assertion (e.g., logic-high states) of the first and second timer signals TMR1 and TMR2 can thus define a detection window for detecting the overvoltage vault via the fault detector 208. Thus, if the fault detector 208 detects the overvoltage condition during the detection window (e.g., after assertion of the first timer signal TMR1 but before assertion of the second timer signal TMR2), the fault detector 208 can provide the fault signal FLT, as described above. However, upon assertion of the second timer signal TMR2 corresponding to expiration of the nuisance overvoltage timer, the detection window concludes. If the fault detector 208 does not detect the overvoltage condition prior to the assertion of the second timer signal TMR2, and thus prior to the expiration of the nuisance overvoltage timer, then the fault detector 208 can provide the reset signal RST to reset the latch-off timer circuit 300. As a result, the overvoltage condition can correspond to a nuisance overvoltage condition, and the normal operation of the power supply system 100 can be maintained.

As described above, the reset signal RST is provided to the timer latch 204 to reset the timer latch 204. Therefore, the latching voltage $V_{LTCH}$ can cease to be provided by the timer latch 204 (e.g., provided at zero volts), thereby opening the charging switch $N_1$. As a result, the charging current $I_{CHG}$ ceases to charge the timing capacitor $C_{TMR}$. Additionally, the reset signal RST is provided to a reset switch $SW_{RST}$ that is arranged in parallel with the timing capacitor $C_{TMR}$, such that the reset signal RST closes the reset switch $SW_{RST}$. Therefore, the timing capacitor $C_{TMR}$ can be discharged to ground through the reset switch $SW_{RST}$ to decrease the timing voltage $V_{TMR}$. Upon reset of the latch-off timer circuit 300 by the reset signal RST, the overvoltage latch-off timer system 200 can result normal operation until another overvoltage condition is detected, as described above, at which the detection process starts over.

In the example of FIG. 3, the latch-off timer circuit 300 also receives the fault signal FLT from the fault detector 208. The fault signal FLT is provided to a P-channel FET (P-FET) $P_1$ via an inverter 310 that interconnects the input voltage $V_{IN}$ and the timing voltage $V_{TMR}$. Therefore, in response to the detection of the persistent overvoltage fault, and thus the assertion of the fault signal FLT, the P-FET $P_1$ is activated to pull the timing voltage $V_{TMR}$ up to approximately the amplitude of the input voltage $V_{IN}$. Therefore, the fault signal FLT can latch the timing voltage $V_{TMR}$ up to provide for radiation-hardened design considerations. Furthermore, in the example of FIG. 3, the fault signal FLT is provided to an N-FET $N_2$ that interconnects the second timer signal TMR2 to ground. Therefore, in response to the detection of the persistent overvoltage fault, and thus the assertion of the fault signal FLT, the N-FET $N_2$ is activated to pull the second timer signal TMR2 down to a logic-low state to prevent false detection of a nuisance overvoltage condition in response to detecting the persistent overvoltage fault.

The third threshold detector 308 is configured to compare the timing voltage $V_{TMR}$ with the third threshold voltage $V_{TH3}$ that is between the first threshold voltage $V_{TH1}$ and the second threshold voltage $V_{TH2}$. As an example, the third threshold voltage $V_{TH3}$ can be closer in amplitude to the second threshold voltage $V_{TH2}$ than the first threshold voltage $V_{TH1}$. As opposed to the first and second threshold detectors 304 and 306, the timing voltage $V_{TMR}$ is provided to the inverting input of the third threshold detector 308. Therefore, the third threshold detector 308 provides the third timer signal TMR3 at a logic-high state in response to the timing voltage $V_{TMR}$ being less than the third threshold voltage $V_{TH3}$. Therefore, as the timing voltage $V_{TMR}$ increases in response to activation of the charging switch $N_1$, the third timer signal TMR3 can be logic-high to hold the overvoltage nuisance detector 210 in the reset state. The third timer signal TMR3 can thus hold the overvoltage nuisance detector 210 in the reset state until just prior to the expiration of the nuisance overvoltage timer (e.g., assertion of the second timer signal TMR2) to provide for radiation-hardened design considerations (e.g., that can affect an undesired state change of the second timer signal TMR2).

Upon expiration of the nuisance overvoltage timer, the third timer signal TMR3 can be logic-low based on the timing voltage being greater than the third threshold voltage VTH3, and the second timer signal TMR2 can be asserted based on the timing voltage being equal to the second threshold voltage $V_{TH2}$ Therefore, the reset signal RST can be provided logic-high while the timing voltage $V_{TMR}$ is between the amplitude of the third threshold voltage $V_{TH3}$ and the second threshold voltage $V_{TH2}$ to discharge the timing capacitor $C_{TMR}$ via the reset switch $SW_{RST}$ to decrease the timing voltage $V_{TMR}$. However, in response to the timing voltage $V_{TMR}$ decreasing less than the third threshold voltage $V_{TH3}$, the third timer signal TMR3 can be asserted (e.g., logic-high) again to de-assert the reset signal RST. Therefore, the reset switch $SW_{RST}$ is opened to allow the timing voltage $V_{TMR}$ to decrease more slowly after detection of the nuisance overvoltage condition.

Figure 4:
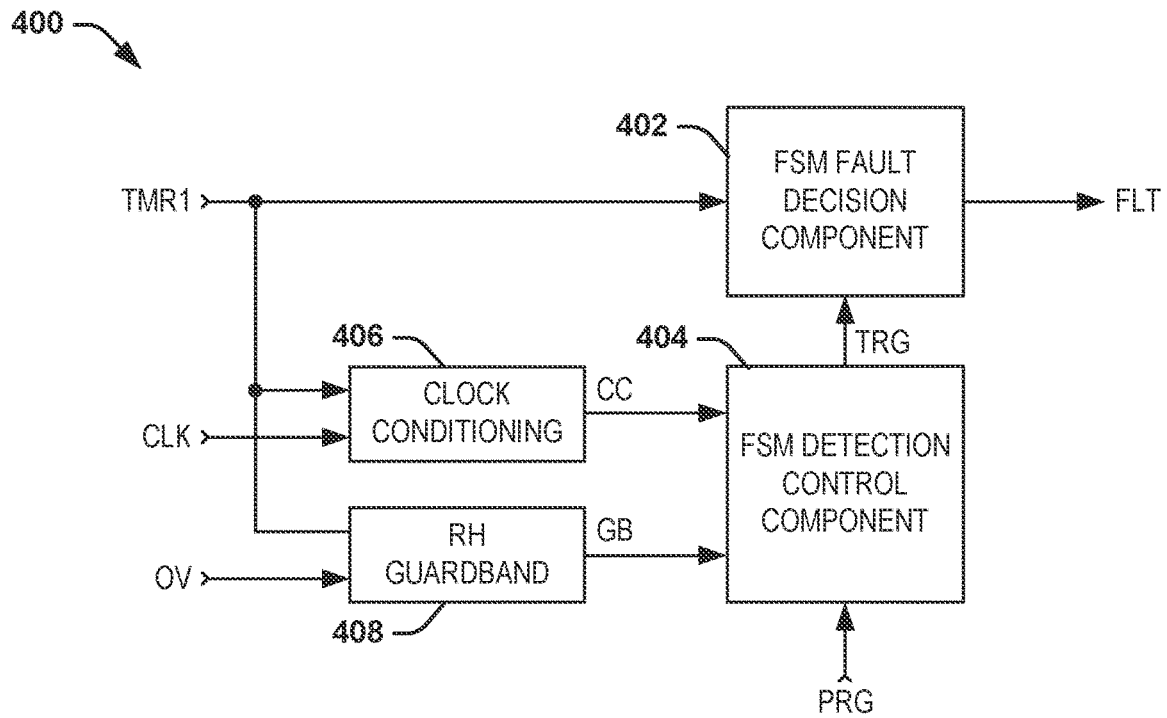
FIG. 4 illustrates an example of a fault detector.

The time between assertion (e.g., logic-high states) of the first and second timer signals TMR1 and TMR2 can thus define a detection window for detecting the overvoltage vault via the fault detector 208. Thus, if the fault detector 208 detects the overvoltage condition during the detection window (e.g., after assertion of the first timer signal TMR1 but before assertion of the second timer signal TMR2), the fault detector 208 can provide the fault signal FLT, as described above. However, upon assertion of the second timer signal TMR2 corresponding to expiration of the nuisance overvoltage timer, the detection window concludes. If the fault detector 208 does not detect the overvoltage condition prior to the assertion of the second timer signal TMR2, and thus prior to the expiration of the nuisance overvoltage timer, then the fault detector 208 can provide the reset signal RST to reset the overvoltage latch-off timer system 200. As a result, the overvoltage condition can correspond to a nuisance overvoltage condition, and the normal operation of the power supply system 100 can be maintained FIG. 4 illustrates an example of a fault detector 400. The fault detector 400 can correspond to the fault detector 208 in the example of FIG. 2. Therefore, reference is to be made to the examples of FIGS. 1-3 in the following description of the example of FIG. 4.

The fault detector 400 includes a fault decision component ("FSM FAULT DECISION COMPONENT") 402 and a detection control component ("FSM DETECTION CONTROL COMPONENT") 404 that are each part of the FSM controller system 110. The fault decision component 402 is configured to receive the first timer signal TMR1 to indicate the expiration of the latch-off timer. The fault decision component 402 also receives a trigger signal TRG that is indicative of the predetermined condition(s) that indicate a persistent overvoltage fault after expiration of the latch-off timer. Therefore, in response to the first timer signal TMR1 and the trigger signal TRG, the fault decision component 402 is configured to generate the fault signal FLT to indicate the detection of the persistent overvoltage fault.

The fault detector 400 also includes a clock conditioning component 406 and a radiation-hardened guard-band component 408. The clock conditioning component 406 and the radiation-hardened guard-band component 408 each likewise receive the first timer signal TMR1 that indicates the expiration of the latch-off timer. The clock conditioning component 406 also receives the clock signal CLK, and the radiation-hardened guard-band component 408 also receives the overvoltage signal OV. The clock conditioning component 406 and the radiation-hardened guard-band component 408 can each be configured to ignore the clock signal CLK and the overvoltage signal OV, respectively, until the expiration of the latch-off timer via the first timer signal TMR1. Thus, the clock conditioning component 406 is configured to provide a conditioned clock signal CC at each pulse of the clock signal CLK after expiration of the latch-off timer. As an example, the conditioned clock signal CC can shorten the pulse-width of the clock signal CLK to mitigate potential logic errors. Similarly, the radiation-hardened guard-band component 408 is configured to provide a guard-band signal GB that can correspond to the overvoltage signal OV after expiration of the latch-off timer. For example, the guard-band signal GB can follow the logic state of the overvoltage signal OV while the first timer signal TMR1 is logic-high.

The detection control component 404 is configured to receive the programming signal PRG and to generate the trigger signal TRG based on the predetermined condition(s) defined by the programming signal PRG. The programming signal PRG can correspond to a programmable digital signal that can define the predetermined condition(s) associated with the detecting the persistent overvoltage fault. As an example, the programming signal PRG can define a number of cycles of the clock signal CLK, as provided by the conditioned clock signal CC, at which the overvoltage signal OV, as provided by the guard-band signal GB, is provided before detecting the persistent overvoltage fault. As another example, the programming signal PRG can define a number of rising-edges of the overvoltage signal OV, as provided by the guard-band signal GB, within a predetermined number of cycles of the clock signal CLK, as provided by the conditioned clock signal CC, before detecting the persistent overvoltage fault. The combination of the clock signal CLK and the programming signal PRG can thus define any of a variety or programmable conditions as prerequisite for detecting the persistent overvoltage fault. In response to the predetermined condition(s) being met, the detection control component 404 can provide the trigger signal TRG, such that the fault decision component 402 can indicate the persistent overvoltage fault after expiration of the latch-off timer by providing the fault signal FLT.

Figure 5:
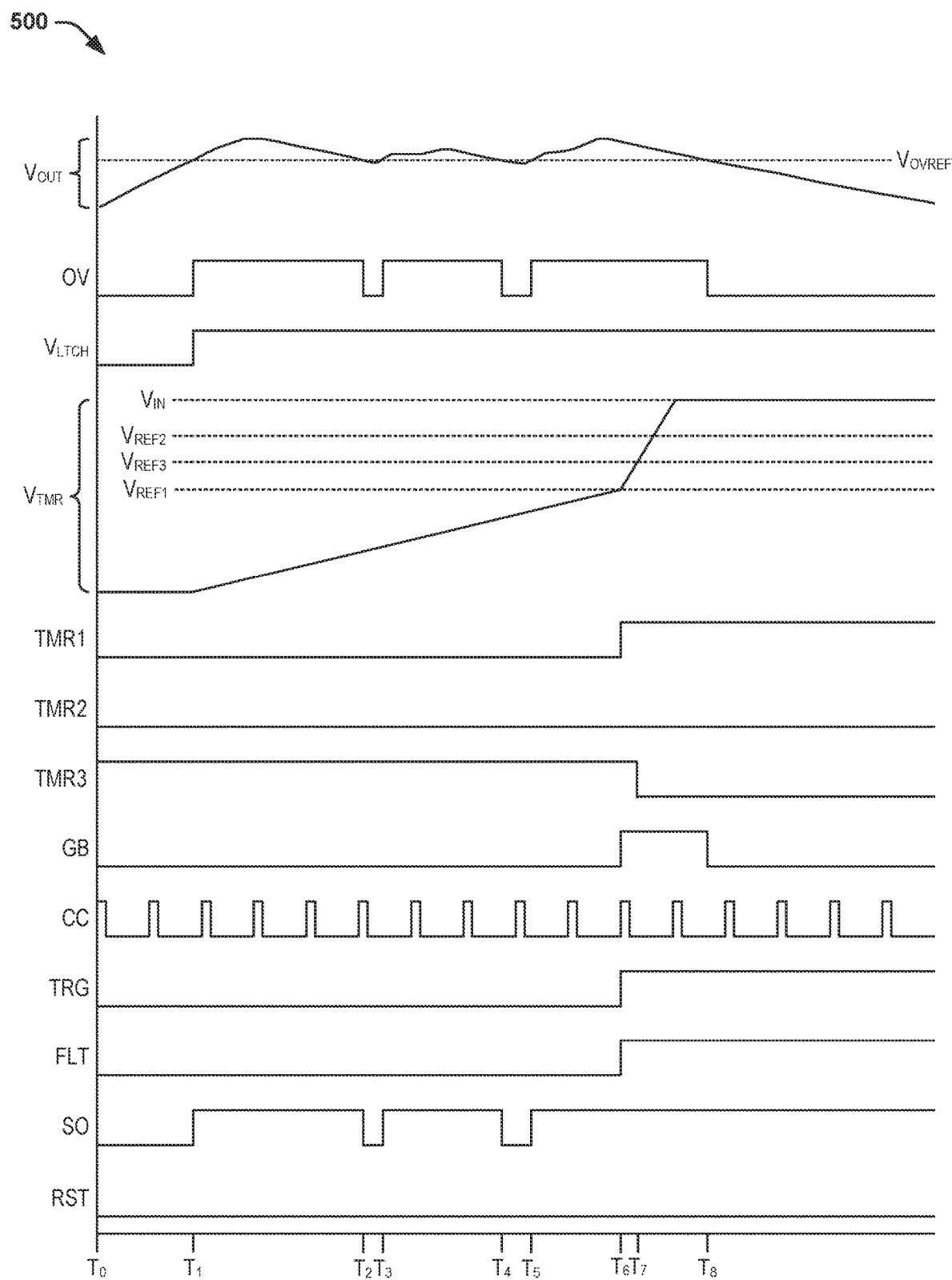
FIG. 5 illustrates an example of a timing diagram.

FIG. 5 illustrates an example of a timing diagram 500. The timing diagram 500 can correspond to operation of the overvoltage latch-off timer system 200 in the example of FIGS. 1-4. Therefore, reference is to be made to the example of FIGS. 1-4 in the following description of the example of FIG. 5.

The timing diagram 500 demonstrates amplitudes of the output voltage $V_{OUT}$, the overvoltage signal OV, the latching voltage $V_{LTCH}$, the timing voltage $V_{TMR}$, the first timer signal TMR1, the second timer signal TMR2, the third timer signal TMR3, the guard-band signal GB, the conditioned clock signal CC, the trigger signal TRG, the fault signal FLT, the shutoff signal SO, and the reset signal RST as a function of time. At a time $T_0$, the timing diagram 500 begins. Beginning at the time $T_0$, the output voltage $V_{OUT}$ is increasing. At a time $T_1$, the output voltage $V_{OUT}$ increases greater than an overvoltage reference voltage $V_{OVREF}$. Thus, at the time $T_1$, the instantaneous overvoltage sensor 104 asserts the overvoltage signal OV from a logic-low state to a logic-high state. In response to the logic-high state of the overvoltage signal OV, the shutoff signal SO is asserted to shutoff the voltage-limiting power regulator 102, and the timer latch 204 can assert the latching voltage $V_{LTCH}$ to a logic-high state to activate (e.g., close) the charging switch $N_1$. As a result, beginning at the time $T_1$, the timing voltage $V_{TMR}$ can begin to increase at a constant slope.

In the example of FIG. 5, beginning at the time $T_1$, in response to the deactivation of the voltage-limiting power regulator 102 via the shutoff signal SO, the output voltage $V_{OUT}$ begins to level off and eventually decrease in amplitude. At a time $T_2$, the output voltage $V_{OUT}$ decreases less than the overvoltage reference voltage $V_{OVREF}$, causing the overvoltage signal OV to be de-asserted to a logic-low state, likewise resulting in the shutoff signal SO being de-asserted in the logic-low state. However, because the timer latch 204 provides the latching voltage $V_{LTCH}$ in a latched manner, the latching voltage $V_{LTCH}$ is maintained at a logic-high amplitude to keep the charging switch $N_1$ closed, and thus to maintain charging of the timing capacitor $C_{TMR}$. Accordingly, the increase in amplitude of the timing voltage $V_{TMR}$ can be maintained at a constant slope to provide a predictable time of the timer, regardless of the amplitude of the output voltage $V_{OUT}$. At a time $T_3$, the output voltage $V_{OUT}$ increases greater than the overvoltage reference voltage $V_{OVREF}$, causing the overvoltage signal OV to be asserted to a logic-high state, likewise resulting in the shutoff signal SO being asserted in the logic-high state. The output voltage $V_{OUT}$ thus can oscillate (e.g., ratchet) above and below the overvoltage reference voltage $V_{OVREF}$ in an aperiodic manner, as further evidenced at times $T_4$ and $T_5$, at which the output voltage $V_{OUT}$ decreases below and increases above, respectively, the overvoltage reference voltage $V_{OVREF}$.

At a time $T_6$, the timing voltage $V_{TMR}$ increases greater than the amplitude of the first threshold voltage $V_{TH1}$. Therefore, the threshold detector 304 provides the first timing signal TMR1 at a logic-high state to the fault detector 208, thus corresponding to expiration of the latch-off timer. Thus, the fault detector 208 determines if the voltage-limiting power regulator 102 exhibits a persistent overvoltage fault. In the example of FIG. 5, the predetermined condition(s) set by the programming signal PRG can correspond to a single clock conditioned signal CC upon expiration of the latch-off timer to detect the persistent overvoltage fault. At the time $T_6$, the overvoltage signal OV is logic-high, indicating that the voltage-limiting power regulator 102 is still experiencing an overvoltage condition. In response to assertion of the first timer signal TMR1, the radiation-hardened guard-band component 408 thus provides the guard-band signal GB. Accordingly, in response to the first clock conditioned signal CC after the time $T_6$ (demonstrated as immediate in the example of FIG. 5), the detection control component 404 can assert the trigger signal TRG. As a result, the fault decision component 402 detects a persistent overvoltage fault based on the logic-high state of both the first timer signal TMR1 and the trigger signal TRG. Therefore, the fault decision component 402 asserts the fault signal FLT.

In response to the fault signal FLT being asserted, the timing voltage $V_{TMR}$ is pulled to the amplitude of the input voltage $V_{IN}$ via the P-FET $P_1$, and the second timer signal TMR2 is pulled to ground via the N-FET $N_2$. At a time $T_7$, the third timer signal TMR3 is de-asserted as the timing voltage $V_{TMR}$ increases greater than the third threshold voltage $V_{TH3}$. Because the shutoff signal SO was asserted at the time $T_5$, the voltage-limiting power regulator 102 was deactivated at the time $T_5$, such that the output voltage $V_{OUT}$ eventually levels off and decreases. At a time $T_8$, the output voltage $V_{OUT}$ decreases less than the overvoltage reference voltage $V_{OVREF}$. As a result, the overvoltage signal OV is de-asserted to a logic-low state, as is the guard-band signal GB. However, because the fault signal FLT remains latched, the shutoff signal SO remains at a logic-high state, thus disabling voltage-limiting power regulator 102 indefinitely in response to detection of the persistent overvoltage fault. Accordingly, the appropriate action can thereafter be taken to repair the persistent overvoltage fault.

Figure 6:
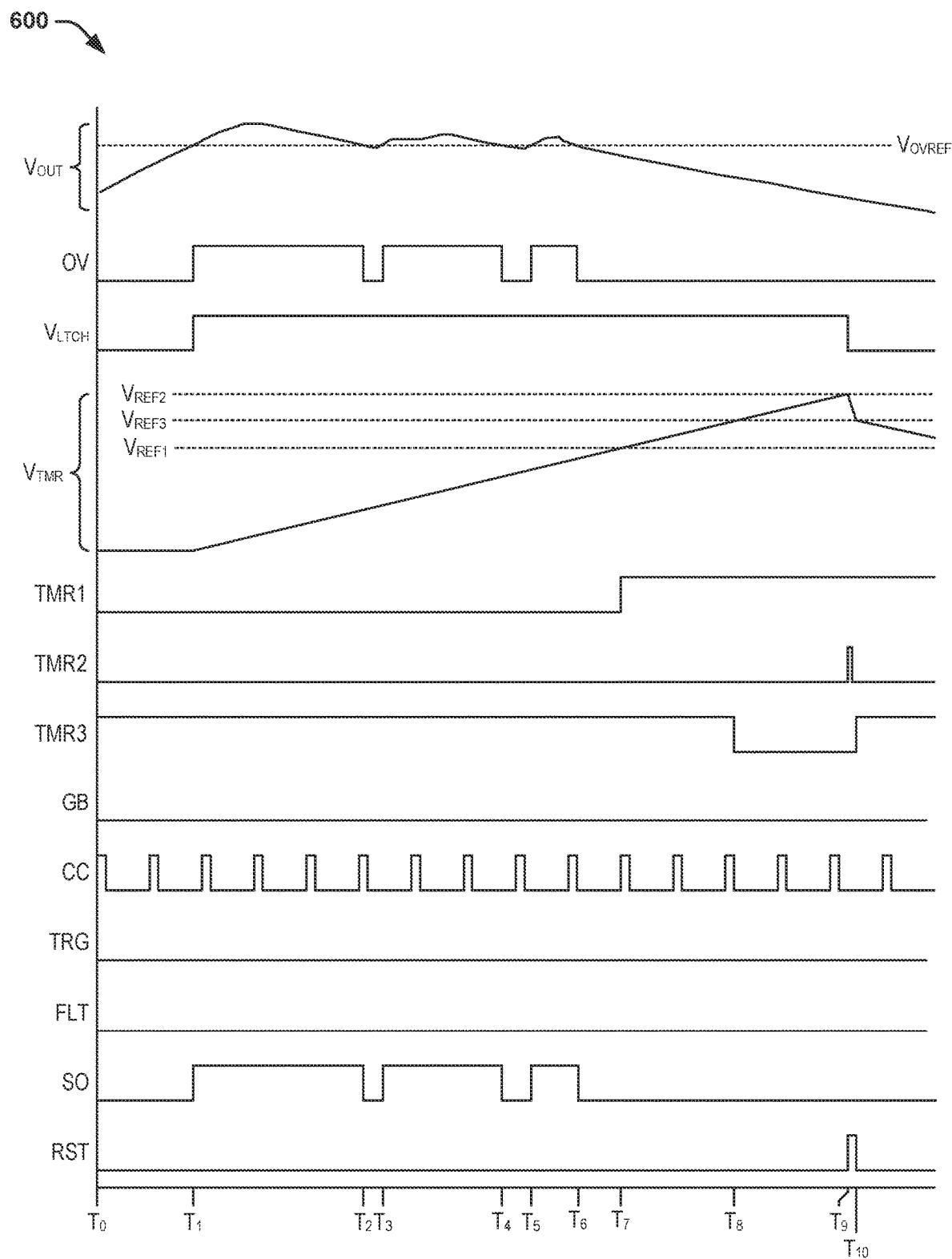
FIG. 6 illustrates another example of a timing diagram.

FIG. 6 illustrates an example of a timing diagram 600. The timing diagram 600 can correspond to operation of the overvoltage latch-off timer system 200 in the example of FIGS. 1-4. Therefore, reference is to be made to the example of FIGS. 1-4 in the following description of the example of FIG. 6.

The timing diagram 600 demonstrates amplitudes of the output voltage $V_{OUT}$, the overvoltage signal OV, the latching voltage $V_{LTCH}$, the timing voltage $V_{TMR}$, the first timer signal TMR1, the second timer signal TMR2, the third timer signal TMR3, the guard-band signal GB, the conditioned clock signal CC, the trigger signal TRG, the fault signal FLT, the shutoff signal SO, and the reset signal RST as a function of time. At a time $T_0$, the timing diagram 500 begins. Beginning at the time $T_0$, the output voltage $V_{OUT}$ is increasing. At a time $T_1$, the output voltage $V_{OUT}$ increases greater than an overvoltage reference voltage $V_{OVREF}$. Thus, at the time $T_1$, the instantaneous overvoltage sensor 104 asserts the overvoltage signal OV from a logic-low state to a logic-high state. In response to the logic-high state of the overvoltage signal OV, the shutoff signal SO is asserted to shutoff the voltage-limiting power regulator 102, and the timer latch 204 can assert the latching voltage $V_{LTCH}$ to a logic-high state to activate (e.g., close) the charging switch $N_1$. As a result, beginning at the time $T_1$, the timing voltage $V_{TMR}$ can begin to increase at a constant slope.

In the example of FIG. 5, beginning at the time $T_1$, in response to the deactivation of the voltage-limiting power regulator 102 via the shutoff signal SO, the output voltage $V_{OUT}$ begins to level off and eventually decrease in amplitude. At a time $T_2$, the output voltage $V_{OUT}$ decreases less than the overvoltage reference voltage $V_{OVREF}$, causing the overvoltage signal OV to be de-asserted to a logic-low state, likewise resulting in the shutoff signal SO being de-asserted in the logic-low state. However, because the timer latch 204 provides the latching voltage $V_{LTCH}$ in a latched manner, the latching voltage $V_{LTCH}$ is maintained at a logic-high amplitude to keep the charging switch $N_1$ closed, and thus to maintain charging of the timing capacitor $C_{TMR}$. Accordingly, the increase in amplitude of the timing voltage $V_{TMR}$ can be maintained at a constant slope to provide a predictable time of the timer, regardless of the amplitude of the output voltage $V_{OUT}$. At a time $T_3$, the output voltage $V_{OUT}$ increases greater than the overvoltage reference voltage $V_{OVREF}$, causing the overvoltage signal OV to be asserted to a logic-high state, likewise resulting in the shutoff signal SO being asserted in the logic-high state. The output voltage $V_{OUT}$ thus can oscillate (e.g., ratchet) above and below the overvoltage reference voltage $V_{OVREF}$ in an aperiodic manner, as further evidenced at times $T_4$ and $T_5$, at which the output voltage $V_{OUT}$ decreases below and increases above, respectively, the overvoltage reference voltage $V_{OVREF}$.

At a time $T_6$, the output voltage $V_{OUT}$ decreases less than the overvoltage reference voltage $V_{OVREF}$, causing the overvoltage signal OV to be de-asserted to a logic-low state, likewise resulting in the shutoff signal SO being de-asserted in the logic-low state. At a time $T_7$, the timing voltage $V_{TMR}$ increases greater than the amplitude of the first threshold voltage $V_{TH1}$. Therefore, the threshold detector 304 provides the first timing signal TMR1 at a logic-high state to the fault detector 208, thus corresponding to expiration of the latch-off timer. Thus, the fault detector 208 determines if the voltage-limiting power regulator 102 exhibits a persistent overvoltage fault.

At the time $T_7$, the overvoltage signal OV is logic-low. Therefore, the predetermined condition(s) for indication of a persistent overvoltage fault are not yet met. Therefore, the fault signal FLT, and thus the shutoff signal SO, remain logic-low. The timing voltage $V_{TMR}$ continues to increase at the linear slope. At a time $T_8$, the third timer signal TMR3 is de-asserted as the timing voltage $V_{TMR}$ increases greater than the third threshold voltage $V_{TH3}$. At a time $T_9$, the timing voltage $V_{TMR}$ increases to approximately equal to the second threshold voltage $V_{TH2}$. Therefore, the nuisance overvoltage timer expires at the time $T_9$.

In response to expiration of the nuisance overvoltage timer at the time $T_9$, the fault decision detector 402 had not detected the persistent overvoltage fault. Instead, a nuisance overvoltage condition has been detected. In response to the timing voltage $V_{TMR}$ increasing approximately equal to the second threshold voltage $V_{TH2}$, the second timer signal TMR2 is asserted to a logic-high state. In response, the overvoltage nuisance detector 210 asserts the reset signal RST. The reset signal RST thus discharges the timing capacitor $C_{TMR}$ via the reset switch $SW_{RST}$ to decrease the timing voltage $V_{TMR}$ beginning at the time $T_9$. Upon the timing voltage $V_{TMR}$ decreasing less than the third threshold voltage $V_{TH3}$ at a time $T_{10}$, the third timer signal TMR3 is asserted (e.g., logic-high) again, thus de-asserting the reset signal RST. Therefore, the reset switch $SW_{RST}$ is opened to allow the timing voltage $V_{TMR}$ to decrease more slowly after detection of the nuisance overvoltage condition. Therefore, the timing voltage $V_{TMR}$ can slowly decrease (e.g., based on leakage) after the time $T_{10}$. Accordingly, the voltage-limiting power regulator 102 can maintain normal operation after detection of the nuisance overvoltage condition, as described above, at which the detection process can start over.

Figure 7:
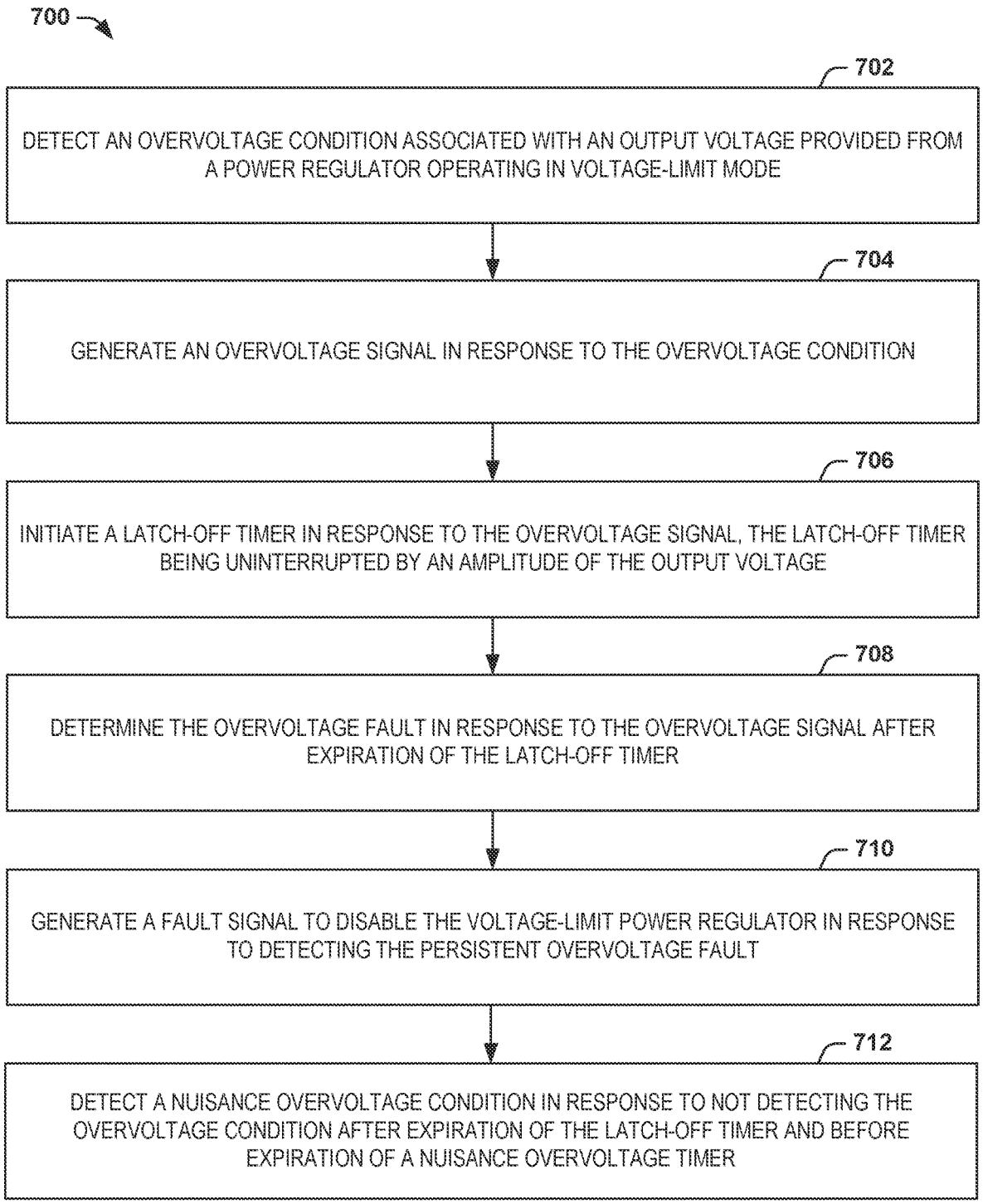
FIG. 7 illustrates an example of a method for detecting a persistent overvoltage fault in a power supply system.

In view of the foregoing structural and functional features described above, a methodology in accordance with various aspects of the disclosure will be better appreciated with reference to FIG. 7. It is to be understood and appreciated that the method of FIG. 7 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 7 illustrates an example of a method 700 for detecting a persistent overvoltage fault in a power supply system (e.g., the power supply system 100). At 702, an overvoltage condition associated with the output voltage (e.g., the output voltage $V_{OUT}$) provided from a voltage-limit power regulator (e.g., the voltage-limiting power regulator 102) is detected. At 704, an overvoltage signal (e.g., the overvoltage signal OV) is generated in response to the overvoltage condition. At 706, a latch-off timer is initiated in response to the overvoltage signal. The latch-off timer can be uninterrupted by an amplitude of the output voltage. At 708, the persistent overvoltage fault is determined in response to the overvoltage signal after expiration of the latch-off timer. At 710, a fault signal (e.g., the fault signal FLT) is generated to disable the voltage-limit power regulator in response to detecting the persistent overvoltage fault. At 712, a nuisance overvoltage condition is detected in response to not detecting the overvoltage condition after expiration of the latch-off timer and before expiration of a nuisance overvoltage timer.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power supply system comprising:
   a power regulator to operate in voltage-limit mode and to generate an output voltage;
   an instantaneous overvoltage sensor configured to detect an overvoltage condition associated with the output voltage; and
   an overvoltage latch-off timer system configured to initiate a latch-off timer in response to detecting the overvoltage condition, the latch-off timer being uninterrupted by an amplitude of the output voltage, the overvoltage latch-off timer system comprising a finite state machine (FSM) configured to detect a persistent overvoltage fault in response to detecting the overvoltage condition after expiration of the latch-off timer and to detect a nuisance overvoltage condition in response to not detecting the overvoltage condition after expiration of the latch-off timer and before expiration of a nuisance overvoltage timer, the overvoltage latch-off timer system being configured to generate a fault signal to disable the voltage-limit power regulator in response to detecting the persistent overvoltage fault.

2. The system of claim 1, wherein the overvoltage latch-off timer system comprises a latch-off timer circuit configured to initiate the latch-off timer.

3. The system of claim 2, wherein the FSM controller system comprises a timer latch configured to generate a latch voltage in response to a logic transition from a first state to a second state of the overvoltage signal, and to maintain the latch voltage in response to a logic transition from the second state to the first state of the overvoltage signal, wherein the latch-off timer circuit comprises:
   a charging switch configured to close in response to the latch voltage, and
   a timing capacitor that is coupled to the charging switch and is configured to charge via a charging current through the closed charging switch to generate a timing voltage.

4. The system of claim 3, wherein the latch-off timer circuit comprises a threshold detector configured to compare the timing voltage with a threshold voltage, the threshold detector providing a timer signal to the FSM controller system in response to the timing voltage being approximately equal to the threshold voltage corresponding to expiration of the latch-off timer.

5. The system of claim 4, wherein the FSM controller system further comprises a fault detector configured to generate the fault signal in response to the timer signal and in response to at least one programmable condition.

6. The system of claim 5, wherein the at least one programmable condition corresponds to receiving the timer signal for at least one of a predetermined time duration and a predetermined number of clock cycles.

7. The system of claim 6, wherein the fault detector comprises a radiation-hardened guard-band component configured to enable the at least one programmable condition in response to the timer signal and the overvoltage signal.

8. The system of claim 4, wherein the threshold detector is a first threshold detector configured to compare the timing voltage with a first threshold voltage to provide a first timer signal, the latch-off timer circuit further comprising a second threshold detector configured to compare the timing voltage with a second threshold voltage that is greater than the first threshold voltage, the second threshold detector providing a second timer signal to the FSM controller system in response to the timing voltage being approximately equal to the second threshold voltage corresponding to the nuisance overvoltage timer.

9. The system of claim 8, wherein the FSM controller system comprises an overvoltage nuisance detector configured to generate a reset signal after expiration of the nuisance overvoltage timer, the reset signal being provided to the timer latch to unlatch the latch voltage to open the charging switch and being provided to a discharging switch to discharge the timing capacitor to decrease the timing voltage.

10. The system of claim 9, wherein the latch-off timer circuit comprises a third threshold detector configured to compare the timing voltage with a third threshold voltage that is between the first and second threshold voltages, the third threshold detector providing a third timer signal to the overvoltage nuisance detector in response to the timing voltage decreasing less than the third threshold voltage, wherein the overvoltage nuisance detector is configured to disable the reset signal in response to the third timer signal.

11. The system of claim 10, wherein the third threshold voltage has an amplitude that is closer to the amplitude of the second threshold voltage than to the amplitude of the first threshold voltage to provide for a radiation-hardened design characteristic, wherein the overvoltage nuisance detector is configured as SR-latch comprising a set input that receives the second timer signal and a reset input that receives the third timer signal, wherein the SR-latch is designed to favor the set input to provide for another radiation-hardened design characteristic.

12. A method for detecting a persistent overvoltage fault in a power supply system, the method comprising:
  detecting an overvoltage condition associated with an output voltage provided from a power regulator operating in voltage-limit mode;
  generating an overvoltage signal in response to the overvoltage condition;
  initiating a latch-off timer in response to the overvoltage signal, the latch-off timer being uninterrupted by an amplitude of the output voltage;
  determining the persistent overvoltage fault in response to the overvoltage signal after expiration of the latch-off timer;
  generating a fault signal to disable the voltage-limit power regulator in response to detecting the persistent overvoltage fault; and
  detecting a nuisance overvoltage condition in response to not detecting the overvoltage condition after expiration of the latch-off timer and before expiration of a nuisance overvoltage timer.

13. The method of claim 12, wherein initiating the latch-off timer comprises:
  generating a latch voltage in response to a logic transition from a first state to a second state of the overvoltage signal; and
  maintaining the latch voltage in response to a logic transition from the second state to the first state of the overvoltage signal to charge a timing capacitor to generate a timing voltage corresponding to the latch-off timer;
  wherein determining the persistent overvoltage fault comprises:
  comparing the timing voltage with a threshold voltage;
  providing a timer signal in response to the timing voltage being approximately equal to the threshold voltage corresponding to expiration of the latch-off timer; and
  generating the fault signal in response to the timer signal and in response to at least one programmable condition.

14. The method of claim 13, wherein comparing the timing voltage comprises comparing the timing voltage with a first threshold voltage to provide a first timer signal, the method further comprising:
  comparing the timing voltage with a second threshold voltage that is greater than the first threshold voltage;
  providing a second timer signal in response to the timing voltage being approximately equal to the second threshold voltage corresponding to expiration of the nuisance overvoltage timer;
  generating a reset signal in response to expiration of the nuisance overvoltage timer absent the at least one programmable condition, the reset signal being provided to unlatch the latch voltage; and
  discharging the timing capacitor in response to the reset signal to decrease the timing voltage.

15. The method of claim 14, further comprising:
  comparing the timing voltage with a third threshold voltage that is between the first and second threshold voltages;
  providing a third timer signal in response to the timing voltage decreasing less than the third threshold voltage; and
  disabling the reset signal in response to the third timer signal.

16. A power supply system comprising:
  a power regulator to operate in voltage-limit mode and to generate an output voltage;
  an instantaneous overvoltage sensor configured to detect an overvoltage condition associated with the output voltage; and
  an overvoltage latch-off timer system comprising:
  a latch-off timer circuit configured to initiate a latch-off timer in response to detecting the overvoltage condition, the latch-off timer being uninterrupted by an amplitude of the output voltage; and
  a finite state machine (FSM) controller system configured to detect a persistent overvoltage fault in response to detecting the overvoltage condition after expiration of the latch-off timer and to generate a fault signal to disable the voltage-limit power regulator in response to detecting the persistent overvoltage fault, and to detect a nuisance overvoltage condition in response to not detecting the overvoltage condition after expiration of the latch-off timer and before expiration of a nuisance overvoltage timer.

17. The system of claim 16, wherein the FSM controller system comprises a timer latch configured to generate a latch voltage in response to a logic transition from a first state to a second state of the overvoltage signal, and to maintain the latch voltage in response to a logic transition from the second state to the first state of the overvoltage signal, wherein the latch-off timer circuit comprises:
  a charging switch configured to close in response to the latch voltage, and
  a timing capacitor that is coupled to the charging switch and is configured to charge via a charging current through the closed charging switch to generate a timing voltage.

18. The system of claim 17, wherein the latch-off timer circuit comprises a threshold detector configured to compare the timing voltage with a threshold voltage, the threshold detector providing a timer signal to the FSM controller system in response to the timing voltage being approximately equal to the threshold voltage corresponding to expiration of the latch-off timer, wherein the FSM controller system further comprises a fault detector configured to generate the fault signal in response to the timer signal and in response to at least one programmable condition.

19. The system of claim 18, wherein the threshold detector is a first threshold detector configured to compare the timing voltage with a first threshold voltage to provide a first timer signal, the latch-off timer circuit further comprising a second threshold detector configured to compare the timing voltage with a second threshold voltage that is greater than the first threshold voltage, the second threshold detector providing a second timer signal to the FSM controller system in response to the timing voltage being approximately equal to the second threshold voltage corresponding to the nuisance overvoltage timer, wherein the fault detector comprises an overvoltage nuisance detector configured to generate a reset signal after expiration of the nuisance overvoltage timer, the reset signal being provided to the timer latch to unlatch the latch voltage to open the charging switch and being provided to a discharging switch to discharge the timing capacitor to decrease the timing voltage.

20. The system of claim 19, wherein the latch-off timer circuit comprises a third threshold detector configured to compare the timing voltage with a third threshold voltage that is between the first and second threshold voltages, the third threshold detector providing a third timer signal to the overvoltage nuisance detector in response to the timing voltage decreasing less than the third threshold voltage, wherein the overvoltage nuisance detector is configured to disable the reset signal in response to the third timer signal.

* * * * *